G. A. SCHIPPER.
METAL CUTTING TOOL.
APPLICATION FILED FEB. 20, 1918.
1,368,457.
Patented Feb. 15, 1921.
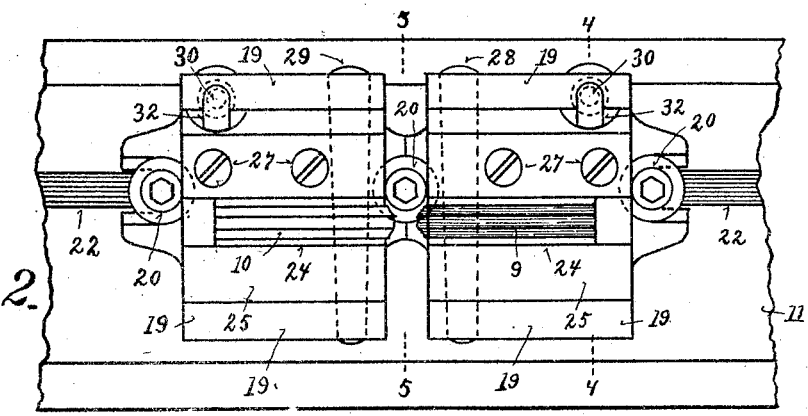
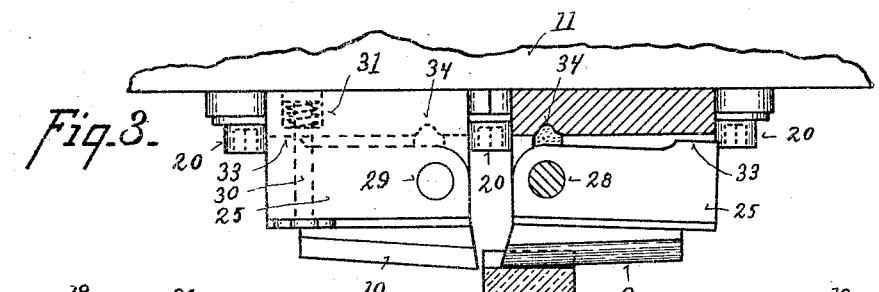
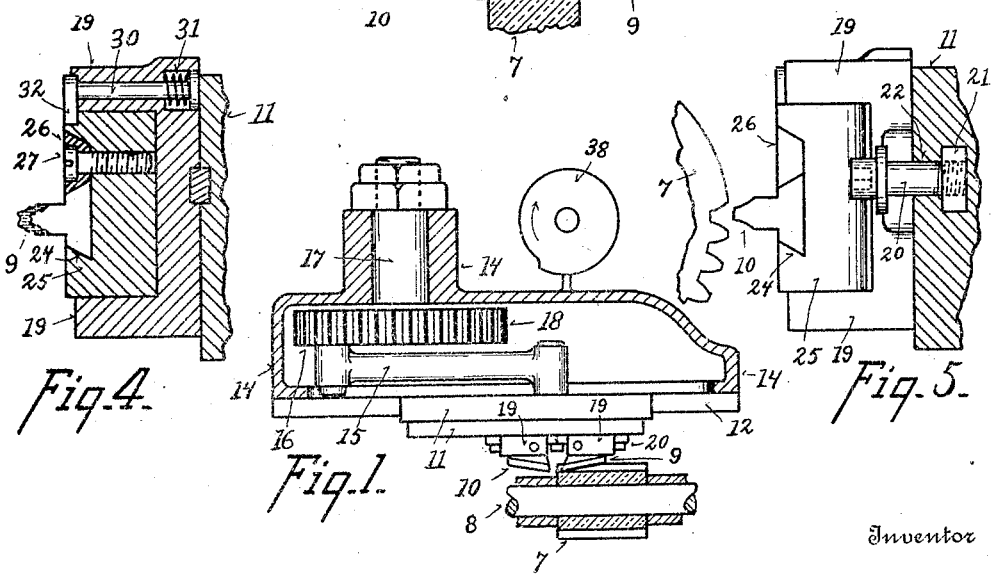
Witness
A. Nasson
H. Thornton Bogert
Inventor
George A. Schipper
By C. W. Miles,
Attorney

UNITED STATES PATENT OFFICE.

GEORGE A. SCHIPPER, OF AURORA, INDIANA, ASSIGNOR OF ONE-HALF TO GEORGE M. STEDMAN, OF AURORA, INDIANA.

METAL-CUTTING TOOL.

1,368,457.     Specification of Letters Patent.     Patented Feb. 15, 1921.

Original application filed October 7, 1914, Serial No. 865,448. Divided and this application filed February 20, 1918. Serial No. 218,297.

*To all whom it may concern:*

Be it known that I, GEORGE A. SCHIPPER, a citizen of the United States, residing at Aurora, in the county of Dearborn and State of Indiana, have invented certain new and useful Improvements in Metal-Cutting Tools, of which the following is a specification.

My invention relates to improvements in metal cutting tools and mountings therefor, and is divisional of my co-pending application Serial No. 865448, filed October 7th, 1914, for improvements in gear cutting machines. One of its objects is to provide alternately operating cutters to serve as roughing and finishing cutters, and to cut away the metal evenly without breaking out or injuring sharp corners or edges or other parts of the work. Another object is to provide accurate and finished work at one operation. Another object is to provide improved means to mount and accurately function alternately acting cutters. My invention also comprises certain details of form, combination and arrangement, all of which will be fully set forth in the description of the accompanying drawings, in which:

Figure 1 is a sectional detail of a portion of a gear cutting machine illustrating the relation of the cutters and cutter driving mechanism to the work.

Fig. 2 is a plan view of the cutters and their supporting mechanism.

Fig. 3 is a side elevation of the same partly in section.

Fig. 4 is a section on line 4—4 of Fig. 2.

Fig. 5 is a section on line 5—5 of Fig. 2.

The accompanying drawings illustrate the preferred embodiments of my invention applied to the cuttting of gears. As illustrated 7 represents the work, or gear to be cut, which is supported rigidly in position upon a mandrel 8, adapted to be rotated step by step as each gear tooth is completed. The cutting tools 9 and 10 are set facing in opposite directions primarily upon a traveling carriage 11, which is guided by ways 12 on the frame 14. A pitman 15 is pivotally connected at one end to the carriage 11, and at its opposite end is pivotally connected to a crank wheel 16. The crank wheel is mounted upon a shaft 17 journaled in the frame 14. The shaft 17 may be driven in any one of the several ways, as for instance by means of a pinion, not illustrated, meshing with gear teeth 18 on the crank-wheel 16. The work may be advanced to the reciprocating cutters or the cutters advanced to the work as desired. I preferably employ a cam, 38, which serves to progressively advance the frame 14 until the desired depth of cut for a gear tooth has been attained whereupon the frame 14 is retracted ready to commence the cutting of another tooth.

In order to attain the desired results one of the cutters 9 has a corrugated outline or pattern while the opposite cutter 10 is of the outline or pattern of the finished cut to be made. Thus each cutter as it traverses the face of the cut to be made shaves or cuts away a series of ridges, which enables the first or roughing cutter 9 to first score the work cutting grooves therein and leaving ridges between the grooves to be taken out by the second or finish cutter 10. The final cut of the cutter 10 leaves the face of the cut smooth and in finished condition. This manner of cutting also enables each of the respective cutters to leave the work at the end of its cut thereon without nicking or chipping out the sharp edge of the work where the cut terminates, even where the metal to be cut is of a brittle nature. It also provides for lifting and clearing the chips ahead of the cutters without undue strain on the cutters, and relieves the tools from liability to chatter.

Provision is preferably made at the crank wheel to variably adjust the throw of the pitman to give the cutters the desired length of stroke. The cutters are secondarily mounted upon blocks 19 which are independently adjustable along the face of the carriage 11 and locked to any desired position by means of bolts 20 and nuts 21 sliding in a T-slot 22 in the face of the carriage, to bring the cutters into the desired position opposite the work to be operated upon.

Each tool is seated in a dovetail slot 24 in the face of a tool carrier 25, being held in place therein by means of a gib 26 secured to the tool carrier by means of screws 27. The respective tool carriers are pivotally mounted relative to the blocks 19 upon tapered pins 28 and 29; at points sufficiently in rear of the cutting edges to enable the cutting edges to move away from and clear the work on their return strokes respectively, and to return to position for a new cut as soon as they have cleared the edge of the work.

Plungers 30 carried by the blocks 19 are actuated by springs 31 and provided with heads 32 which engage the rear ends of the tool carriers to yieldingly hold the cutters in operative or cutting position and to return them to cutting position at the end of each return stroke. At the rear end, each tool holder has a shoe 33 to firmly and accurately seat against the face of the block 19 and resist and transmit the strain of the cutting operation to said blocks. This engagement of the rear end of the tool holders with the block 19 together with accurate journaling of the tool holders without lost motion upon the tapered pins, provides for the degree of accuracy required in cutting gears and similar work. The cutters 9 and 10 are of uniform cross section throughout their length, and to sharpen them are ground across their front or cutting end and then advanced relative to the tool holders, thereby providing for utilizing practically the entire length of the cutters for cutting purposes, and without liability of deviation from the original or desired cross-sectional pattern of the cutters. Rubber or felt buffers 34 are preferably employed to assist in avoiding lost motion. My improved cutters are thus enabled with a minimum of strain upon the work and operative parts, to operate at high speed, and with accuracy.

The mechanism herein illustrated and described is capable of considerable modification without departing from the principle of my invention.

Having described my invention what I claim is:—

1. A metal cutting tool comprising a reciprocating carriage, a plurality of tool holders pivotally mounted thereon in opposed relation and provided with stop members to limit their pivotal movement and rigidly hold the respective tool holders in position relative to the carriage during the cutting operation, means mounted upon the carriage to yieldingly hold the respective tool holders in position for the cutting operation, and shaping tools mounted upon said respective tool holders to each present one end as a cutting instrument and to alternately engage the work in a cutting operation, one of said cutters having a cross-sectional outline of the pattern of the finished cut, and the other cutter having a similar cross-sectional outline with grooves therein.

2. A metal cutting tool comprising a shaping cutter of uniform cross sectional pattern throughout its length and of the outline of the cut to be made, and a shaping cutter of uniform cross sectional pattern differing from the cross sectional pattern of said first named cutter by having grooves therein, said cutters being mounted in opposed relation to each other to reciprocate across the face of the work and alternately engage the same in cutting relation.

3. A metal cutting tool comprising a cutting tool having a cross sectional pattern throughout its length the same as that of the finished cut to be made, and a cutting tool having an undulating cross sectional pattern throughout its length, the cutting faces of said tools being at one end thereof, and said tools alternately operatively engaging the work by being thrust endwise into engagement therewith.

4. A metal cutting tool comprising a reciprocating carriage having a channel to laterally guide a tool holder, a tool holder pivotally mounted in said channel, the pivotal point being close to and in rear of the point where the cutting operation occurs, a shoe at the rear of said tool holder to engage the carriage to limit the pivotal movement of the tool holder, a cutting tool of uniform cross sectional pattern throughout its length mounted upon and adjustable endwise relative to said tool holder, the cutting face of said tool being at one end thereof and the cut being effected by an end thrust of said tool.

In testimony whereof I have affixed my signature in the presence of two witnesses.

GEORGE A. SCHIPPER.

Witnesses:
L. E. DAVIES,
C. H. FUNKE.